United States Patent Office 2,821,084
Patented Jan. 28, 1958

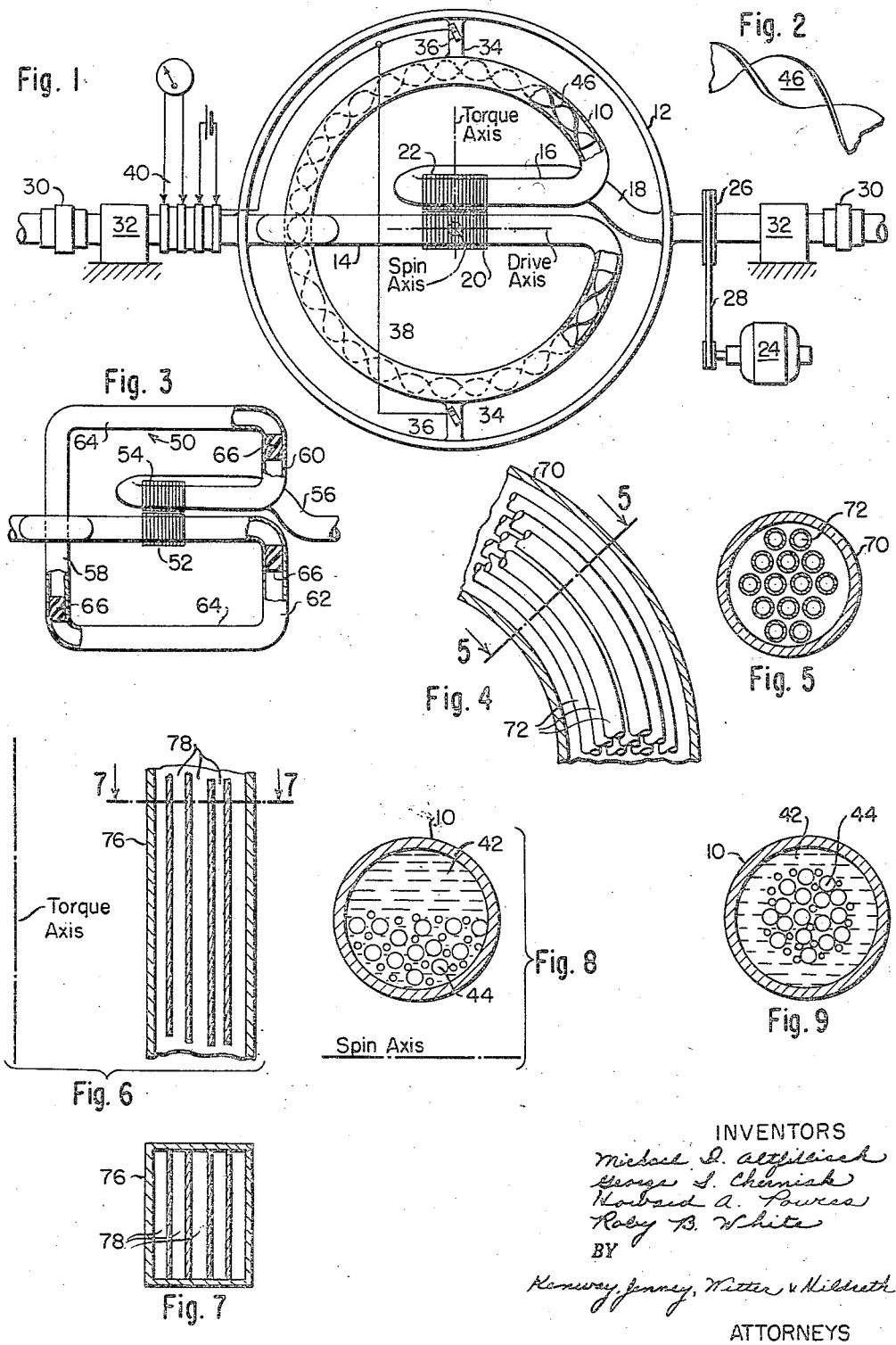

2,821,084

FLOW CONTROL DEVICES FOR FLOWMETERS

Michael D. Altfillisch, Canton, George S. Cherniak, Newton, Howard A. Powers, Medfield, and Roby B. White, Sharon, Mass., assignors, by mesne assignments, to American Radiator & Standard Sanitary Corporation, New York, N. Y., a corporation of Delaware Application September 7, 1954, Serial No. 454,486

6 Claims. (Cl. 73—194)

This invention relates to mass flowmeters and more particularly to means for stabilizing the effective radius of the rotating mass in flowmeters employing gyroscopic principles.

The simplest of gyroscopic flowmeters employ a conduit which generates a coil and which is caused to precess about an axis perpendicular to the axis of said coil. As fluid flows through the conduit and the conduit is rotated about an axis lying in the plane of the coil, a precessional torque is produced about a third axis perpendicular to the two named axes. The torque exerted against the coil is a function of the mass flow rate of fluid passing therethrough. This is demonstrated mathematically by the governing formula $T = 2\pi R^2 rW$, where R is the radius of the coil, $r$ is the angular velocity of the coil about the drive axis in radians per second, and W is the mass flow rate of the fluid in slugs per second. The invention herein disclosed deals only with the stabilization of the R factor.

In the theoretical gyroscopic flowmeter, flow is considered to be confined to a line and, therefore, the radius of the effective mass from the coil axis is constant. However, in practice it is obviously necessary to use conduits of finite diameters, frequently of a diameter over one tenth the total diameter of the spinning mass. When a heterogeneous fluid is passed through the conduit, both the centrifugal force induced by rotation of the sensing loop about its drive axis and the centrifugal force induced by the fluid traveling in a curved path through the sensing loop about the coil axis cause the heavier particles of fluid to move against the outer walls of the coil; hence the effective radius R of the rotating mass is substantially increased. When it is remembered that the R factor is squared in the equation set forth above, the magnitude of the error produced by this separation becomes painfully clear.

The primary object of this invention, therefore, is to eliminate changes in the effective radius of the rotating mass in mass flowmeters.

In the accomplishment of this and other objects, we provide as one important feature of this invention a twisted ribbon in the conduit of the sensing coil for maintaining the axis of the conduit coincident with the center of mass of fluid in each segment thereof.

Another feature of this invention is the provision of swirling vanes in the inlet end of the vertical legs of a mass flowmeter of square configuration.

Other objects and features of this invention will be more readily understood and appreciated from the following description of a number of embodiments therefore selected for purposes of illustration and shown in the accompanying drawing in which:

Fig. 1 is an elevation view partially in section of a flowmeter constructed in accordance with this invention, Fig. 2 is a fragmentary view of the twisted ribbon employed in the embodiment of this invention illustrated in Fig. 1, Fig. 3 is a view in elevation with parts broken away of another form of flowmeter constructed in accordance with this invention, Fig. 4 is a fragmentary view in section of another flowmeter constructed in accordance with this invention, Fig. 5 is a view in section taken along section line 5—5 of Fig. 4, Fig. 6 is a fragmentary view in section of another embodiment of this invention, Fig. 7 is a view in section taken along section line 7—7 of Fig. 6, Fig. 8 is a view in section of a conduit illustrating the separation of the heavier particles of fluid in a conventional flowmeter, and Fig. 9 is a sectional view similar to Fig. 8 illustrating the position of the particles of fluid passing through the flowmeters of Figs. 1 and 3.

Proceeding to a detailed description of the embodiments illustrated, Fig. 1 reveals a gyroscopic flowmeter employing a coil conduit 10 through which fluid whose mass rate of flow is to be measured is directed. An inlet conduit 14 crosses the diameter of the loop or coil 10 and is adapted to introduce the fluid from its main line into the coil. A return conduit 16 serves as a means for carrying fluid from the coil to an outlet conduit 18. A pair of blocks 32 support the above-named structure in rotatable position about an axis formed by the inlet and outlet conduits.

Rotation of the coil about the inlet and outlet conduits is effected by a motor 24 connected to a pulley 26 mounted on the outlet conduit by a belt 28. Couplings 30 mounted on the terminal portions of the inlet and outlet passages 14 and 18 permit the meter to be connected into a main fluid line without restricting the rotation of the meter.

Fluid introduced to the meter passes through the coil 10 and out through the conduit 18 and may be considered the equivalent of the spinning flywheel of the conventional gyroscope with the axis of the coil as the flywheel spin axis. Under well known gyroscopic principles, displacement of the coil will result when an impressed force is applied to the spinning flywheel, or in the meter described, to the coil 10. The rotation of the coil about the drive axis, i. e. the axis of inlet and outlet conduits 14 and 18 serves as a means for obtaining precession of the flywheel. When the motor is energized, a gyroscopic couple will be exerted about the axis perpendicular to the coil and drive axes, which lies in the plane of the paper perpendicular to the conduit 14 when the coil is in the position illustrated.

To permit a slight rotation of the coil about the third or torque axis, flexible bellows 20 and 22 are positioned to interrupt the conduits 14 and 16 respectively, and intersect the torque axis. The formula set forth in the introductory paragraphs reveals that the torque exerted about the torque axis is a function of the mass flow rate of the fluid passing through the coil.

The means for measuring torque will now be described. A gimbal 12 mounted for rotation with the coil 10 carries a pair of torque bars 34 aligned axially with the torque axis. The inner ends of the torque bars 34 are connected to the coil 10 and will twist in response to the deflection of said coil. A pair of strain gauges 36 mounted on the torque bars are connected by a conductor 38 to a slip ring assembly 40 carried by the inlet conduit 14. The strain gauges will control a signal in the conventional manner to render a voltage proportional to the torque exerted on the bars 34 by the deflection of the coil.

The device thus far described is subject to the errors created by the separation of the particles of a heterogeneous fluid under the influence of the centrifugal force induced by rotation of the coil about the drive axis and the centrifugal force induced by the fluid traveling in a curved path through said coil. An inspection of Figs. 8 and 9 may best illustrate the displacement of the effective radius of the rotating mass under the influence of these forces. If a heterogeneous mixture of air and water is passed through the coil, the centrifugal forces will separate the particles causing the water 42 to move against the outer wall of the coil conduit displacing the air that initially was intermixed with the water in that area. It is apparent that the radius of the rotating mass no longer may be measured to the center line of the conduit but instead must be measured to some point between the center and the outer wall. Because this point will vary with different rates of flow and mixtures, the R factor in the governing equation will obviously introduce appreciable error in mass flow measurements if the effective radius is measured to the center line of the conduit. If some means is introduced, however, to cause the fluid particles to arrange themselves in the manner illustrated in Fig. 9, the effective radius of the mass may be measured from the center line of the conduit; hence the distance becomes determinable for all mixtures and flow rates, and accuracy of measurement results.

To perform this function, a twisted ribbon may be inserted into the conduit forming the coil. Such a ribbon is illustrated in Fig. 2. The flow of the fluid through the coil will take the form of a continuous helix rendering symmetrical the distribution of the fluid particles about the axis of the conduit. Although the centrifugal forces may be in the magnitude of 8 to 10 G's under the influence of the curved fluid path, and forces of a like magnitude or much greater are often created by rotation about the drive axis, nevertheless, a twisted ribbon made of a rigid material such as aluminum or certain plastics will overcome these forces to stabilize the R factor in the equation. Thus by what appears to be a relatively simple device, accuracy of the flow measurement may be greatly increased.

Although the twisted ribbon has been described and illustrated in a flowmeter having a coil of round configuration, obviously it may be employed with equal convenience and effectiveness in a coil of other configuration such as a square, oblong or oval.

Proceeding now to a description of the embodiment of this invention illustrated in Fig. 3, inspection of the drawing reveals that the flowmeter therein illustrated is similar to the embodiment of Fig. 1. However, the conduit has been formed to generate a square instead of a circle as in the preceding embodiment. Our copending application Ser. No. 454,487, filed September 7, 1954, sets forth in great detail the advantages derived from employing a coil of rectangular configuration. It is deemed sufficient to state here that the forces created by the flow of fluid through the arms of the coil which are parallel to the drive axis are ineffective in producing a gyroscopic couple about the torque axis. Because the forces produced by the fluid passing through the arms parallel to the drive axis do not contribute to the torque measured, any separation of the particles of a heterogeneous fluid will not affect the accuracy of the meter. Therefore, our efforts have been restricted to the legs of coil perpendicular to the drive axis, for only these carry fluid which is effective in producing a torque about the torque axis.

In detail, fluid is introduced into the rectangular coil 50 by an inlet conduit 52. After fluid has passed through the coil conduit, a return conduit 54 which intersects the torque axis carries the fluid to an outlet conduit 56. By the same means as are employed in the previously described embodiment, the coil 50 may be caused to precess about the drive axis, and the torque which results in coil deflection may be measured. It is apparent from an inspection of the drawing that separation of the fluid particles under the influence of the centrifugal forces created by the rotation of the coil about the drive axis will not change the effective radius of the rotating mass in the legs 58, 60 and 62. Only the centrifugal force created by the fluid as it changes direction as it flows through the coil will alter its effective radius. Because we are not concerned with arms 64 but only with separation of the fluid particles in the legs 58, 60 and 62, corrective measures need only be taken in the entrance to these legs. Short segments of helical vanes 66 are employed to counteract the effects of the centrifugal force created as the fluid enters the effective legs. Obviously these vanes need not extend the full length of the legs 58, 60 and 62 for no change of fluid direction occurs throughout their length. The vanes 66 will perform the same function as the twisted ribbon in the preceding embodiment and the fluid particles will conform to the arrangement shown in Fig. 9.

Although helical vanes have been described to rotate the fluid, thereby causing the fluid particles to balance about the center of the conduit in the vertical legs, obviously other means may be employed with the same success.

Proceeding now to another embodiment of this invention, Fig. 4 illustrates a segment of a conduit forming a coil of the sensing loop of a mass flowmeter. The conduit 70 may be a portion of the coil 10 shown in Fig. 1. The conduit 70 in the embodiment illustrated serves as a housing for a number of smaller conduits 72 which actually carry the fluid whose mass flow rate is to be measured. The smaller conduits 72 may be provided with a manifold intake and a manifold outlet, if desired, and may be bundled together and fitted closely in at least one plane to the interior of the conduit 70. The advantages derived from the employment of a number of smaller conduits may best be demonstrated by an analysis of the displacement of the center of mass of the fluid in a segment of the conduit under the influences of the centrifugal forces. If we assume that the heterogeneous fluid flowing through the conduit comprises by volume 50% air and 50% water, the centrifugal forces acting thereon will displace the center of mass in said segment approximately 20% of conduit diameter. That is to say, if a 2" conduit is employed to form the sensing coil, the effective radius of the rotating mass will be increased approximately .4 inch by the separation of the water and air in the manner illustrated in Fig. 8. However, if the 2" conduit is replaced by four ½" conduits, the effective radii of the mass will be increased by approximately .1 inch under the same force. By limiting the changes of effective radius of the rotating mass, obviously the error introduced by such changes is greatly reduced. The advantages of employing a number of small conduits now become apparent. Although small separation occurs in each of the conduits 72, the gross separation of the fluid particles is eliminated.

The correction effected by the multiple tube arrangement may be enhanced by twisting the package of tubes inserted into the conduit 70. This configuration is particularly desirable if it is found that the tubes are not receiving a mixture proportional to the overall mixture to be measured. The twisted tube assembly will have an effect similar to the twisted ribbon of Fig. 2.

The embodiment of this invention illustrated in Figs. 6 and 7 is very similar to the embodiment of Figs. 4 and 5. The multi-tube package is replaced by a relatively narrow conduit 76 divided transversely into a number of passages 78. Its purpose, once again, is to limit changes in the geometry of the gyroscope through changes in effective radius. Its effectiveness may be demonstrated in the same manner as set forth above with respect to the embodiment of Figs. 4 and 5.

Although the ribbon tube 76 is illustrated as forming a vertical leg of a rectangular sensing coil, it may with the same effectiveness be utilized in coils of other configurations.

Having thus described numerous embodiments of our invention, other configurations will readily occur to one skilled in the art to which this invention pertains. Although each of the corrective measures has been illustrated and described as it may be employed with flowmeters employing gyroscopic principles, nevertheless it may find, a use in flowmeters operated on other principles, for example, those where the torque measured is a reaction to the Coriolis force of the flowing fluid. Therefore, it is not our intention to be limited to the specifically described and illustrated embodiments, but only by the appended claims.

What we claim as new and desire to secure by Letters Patent of the United States is:

1. In a gyroscopic mass flowmeter having an inlet conduit and an outlet conduit defining a first axis and a central conduit disposed between and interconnected with said inlet and outlet conduits, said central conduit being formed into a coil having an axis normal to said first axis, and means for rotating said central conduit about said first axis, means for directing fluid through said conduits and guide means disposed in at least a portion of said central conduit for maintaining the center of mass of said fluid substantially coincident with the center of said central conduit.

2. In a gyroscopic mass flowmeter having an inlet conduit and an outlet conduit defining a first axis and a central conduit disposed between and interconnected with said inlet and outlet conduits, said central conduit being formed into a coil about a second axis normal to said first axis, and means for rotating said central conduit about said first axis, means for directing fluid through said conduits, means for determining precession of said central conduit about a third axis normal to said first and second axes, and guide means disposed within at least a portion of said central conduit for restricting the separation of fluid particles passing therethrough.

3. In a gyroscopic mass flowmeter having an inlet conduit and an outlet conduit defining a first axis, and a central conduit disposed between and interconnected with said inlet and outlet conduits, said central conduit being formed into a coil about a second axis normal to said first axis, means for rotating said central conduit about said first axis, means for directing fluid through said conduits, means for determining precession of said central conduit about a third axis normal to said first and second axes, and a twisted ribbon mounted in said central conduit for maintaining the center of mass of said fluid flowing therein substantially coincident with the center of said central conduit.

4. A flowmeter as described in claim 2 further characterized by said central conduit being of rectangular configuration and said guide means comprising swirling vanes positioned in the inlet of the portions of said central conduit disposed perpendicular to the axis about which said central conduit rotates.

5. A flowmeter as defined in claim 2 wherein said guide means comprises a plurality of tubes positioned in said central conduit forming a plurality of passages.

6. A flowmeter as defined in claim 2 wherein said guide means comprises a plurality of parallel walls disposed in said central conduit for forming said central conduit into a plurality of narrow passages.

References Cited in the file of this patent
UNITED STATES PATENTS

| | | |
|---|---|---|
| 898,741 | Isaacs | Sept. 15, 1908 |
| 985,216 | Sims | Feb. 28, 1911 |
| 1,603,653 | Ward | Oct. 19, 1926 |
| 1,827,727 | Blizard | Oct. 20, 1931 |
| 2,020,194 | Kuhlmann | Nov. 5, 1935 |
| 2,624,198 | Pearson | Jan. 6, 1953 |

OTHER REFERENCES

A publication entitled "A Fast-Response True-Mass-Rate Flowmeter" by Yao Tzu Li et al. in A. S. M. E. Transactions, July 1953, pp. 825–841.